Dec. 4, 1951 G. E. LUCKS 2,576,954
AIR VALVE FOR STEAM SYSTEMS
Filed May 28, 1949
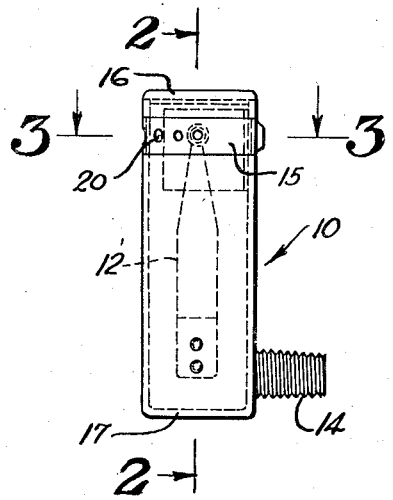
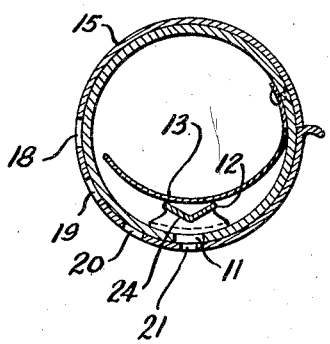
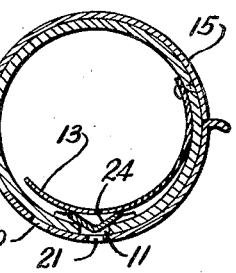
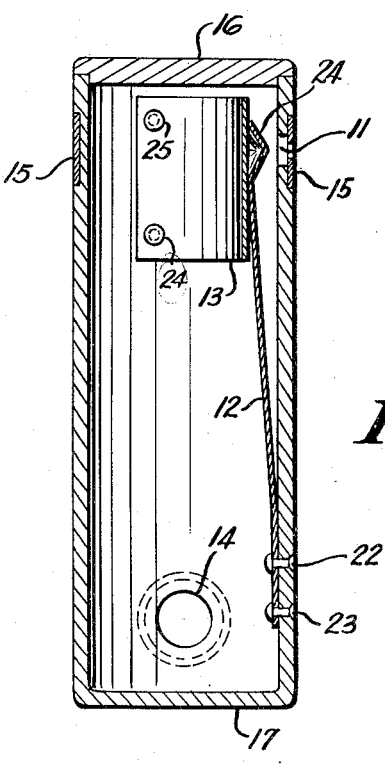
INVENTOR
GUSTAV. E. LUCKS
BY
ATTORNEYS Patented Dec. 4, 1951

2,576,954

UNITED STATES PATENT OFFICE 2,576,954

AIR VALVE FOR STEAM SYSTEMS

Gustav E. Lucks, Greenfield Park, N. Y.

Application May 28, 1949, Serial No. 95,987

2 Claims. (Cl. 236—66)

This invention relates to improvements in air valves for radiators and the pipe lines of steam heating systems.

It is an object of the instant invention to provide an air valve which will enable steam to be transmitted more quickly to a given point than is possible with known air valves.

A further object is the conservation of fuel in the operation of steam generating plants.

Another object is to provide an air vent suitable for either low or high steam pressure systems.

Other objects of the instant invention will become apparent in the course of the following specification.

In the accomplishment of these objectives, the improved air valve is constituted of a hollow body which is closed except for an air vent and a connection to the radiator or pipe line of the steam generating system. On the outside of the valve and slidable over the air vent is a flexible band in which a series of openings of varying area are formed so that the magnitude of the vent is adjustable by merely turning the band until the opening of desired magnitude is centered over the orifice of the vent. Within the valve are two coacting bi-metallic elements which automatically open and close the air vent as the temperature in the valve rises and falls.

The invention will appear more clearly when taken in connection with the accompanying drawings showing by way of example a preferred embodiment of the inventive idea.

In the drawings:

Figure 1 is an elevational view of the air valve constructed in accordance with the principles of this invention.

Fgure 2 is a sectional view along 2—2 of Figure 1 but on an enlarged scale.

Figure 3 is an enlarged sectional view along 3—3 of Figure 1 with the bi-metallic elements in the open position of the air vent.

Figure 4 is similar to the sectional view of Figure 3 except that the bi-metallic elements are in position to close the air vent.

Referring now in greater detail to the drawings where like reference numerals indicate like parts, reference numeral 10 indicates the air valve, 11 the air vent through the valve, 12 the bi-metallic element opening and closing the air vent, and 13 another bi-metallic element coacting with the first element 12.

The body of the air valve 10 is hollow and may be of cylindrical cross section as illustrated or of other shape. The top and bottom of the cylindrical body are closed by the members 16 and 17 which may be attached by any known means.

Through the side wall of the body is an air vent 11 of circular cross section which forms a passageway from the outside to the interior of the valve. The outer surface of the cylindrical body above and below the air vent 11 is constricted therearound as most clearly shown in Figure 2. Slidable around the constricted surface portion is a flexible band 15 of any suitable material such as metal. Spaced around the band 15 are a series of circular openings 18 through 21 of progressively decreasing diameter starting, for example, with one of the same diameter as the vent 11. The series of openings are so positioned on the band that by sliding the band around the cylindrical body of the valve any one of the openings may be centered over the air vent 11 to decrease the area of the orifice thereof.

Also through the wall of the hollow body is another opening in which a nipple 14 is threaded for the attachment of the air valve 10 to a radiator or a steam pipe line (not shown) with which the valve communicates for the introduction of the steam of the system into the valve. Of course, the nipple 14 may be in almost any desired position on the hollow body.

Within the air valve 10 are two bi-metallic elements 12 and 13 which coact to automatically seal the inner orifice of the air vent 11 when the temperature in the valve has reached a predetermined level.

The bi-metallic element 12 is a strip of known superposed metals designed to bend from the position shown in Figure 2 toward the air vent 11 when subjected to a rise in temperature. At the bottom, the element 12 is fastened to the inner wall of the hollow body by any suitable fasteners 22 and 23 (Fig. 2). At the top of the element 12 there is an outwardly extended conical protrusion 24 so positioned that as the top of the element 12 moves toward the inner wall of the valve body under a rise in temperature, the protrusion 24 will enter the inner rim of the air vent 11 to close the same.

Coacting with the bi-metallic element 12 is a second bi-metallic element 13 which has an arcuate cross section in a horizontal plane (Figs. 3 and 4). The edge of one side of the second element 13 is attached to the inner wall of the valve by the known fasteners 24a and 25 while the opposite side is curved to lie against the inner surface of the first element 12 as illustrated in Figures 2, 3, and 4. With a rise in temperature in the valve, the top of the first element 12 moves toward the vent 11 and forces the protrusion 24 within the inner rim thereof. The free side of the second element 13 also subjected to the heat moves toward the vent 11 and pressing against the top of the first element 12 forces the protrusion 24 into the vent to form a substantial seal.

Obviously, by increasing the size of the bi-metallic elements, the valve is suitable for high pressure steam systems as well as low pressure systems.

The operation with subject air valve is as follows:

In the openings usually provided in the radiators of steam systems or formed in the pipes of the system where desired, the air valve 10 is attached by the nipple 14. Dependent upon the distance of the valve 10 from the boiler, that is the volume of air which must be vented before steam can reach the valve, the band 15 is rotated until the size of one of the openings 18 through 21 slide over the air vent 11 provides an orifice in the valve that will exhaust the air between the steam generating point and the valve in the shortest interval of time. Thus, steam is quickly transferred to the valved point without wasting fuel to increase the steam pressure as ordinarily practiced. When steam enters the valve 10, the upper part of the first bi-metallic element 12 bends toward the vent 11 with the conical protrusion 24 in the air vent 11 to block the escape of the steam from the system. Simultaneously with the bending of the first element 12, the free side of the second bi-metallic element 13 moves from the position shown in Figure 3 to that shown in Figure 4 where it exerts additional pressure against the top of the first element 12 the more securely to seal the air vent 11. When the temperature in the air valve falls to a predetermined point, the elements 12 and 13 automatically return to the position shown in Figure 3 which opens the air vent 11 to allow air to enter the steam system to facilitate the return of the condensed steam to the generating point.

It will be understood that the invention is not limited to the exact disclosure herein described but may lend itself to a variety of expressions within the scope of the appended claims.

What is claimed is:

1. An air valve for steam heating systems comprising, in combination, a hollow, elongated, cylindrical body with closed upper and lower ends, the body having an air vent through the side adjacent to the upper end, an elongated bi-metallic element within said hollow body, the element having an integrally formed protuberance adjacent the upper end thereof, means securing the lower end of the element within the hollow body with the protuberance in operable engagement with the vent when the temperature is raised; a second semi-cylindrical, bi-metallic element within said hollow body adjacent to the upper end thereof, the second element coacting with said protuberance, means securing one edge of the second element to the inner surface of the body, the second element engaging the inner surface of the free end of the first element and pressing the protuberance into the air vent when the temperature is raised, and a band carried by said cylindrical body and having a plurality of differently sized openings formed therein and adapted to be moved into alignment with said air vent for varying the size of said air vent.

2. An air valve for steam heating systems comprising, in combination, a hollow, elongated, cylindrical body with closed upper and lower ends, the body having an air vent through the side adjacent the upper end, an elongated, bi-metallic element within said hollow body, the element having an integrally formed protuberance adjacent the upper end thereof, means securing the lower end of the element within the hollow body with the protuberance in operable engagement with the vent when the temperature is raised; a second, semi-cylindrical, bi-metallic element within said hollow body adjacent to the upper end thereof, the second element coacting with said protuberance, means securing one edge of the second element to the inner surface of the body, the second element engaging the inner surface of the free end of the first element and pressing the protuberance into the air vent when the temperature is raised.

GUSTAV E. LUCKS.

REFERENCES CITED

The following references are of record in the file of this patent:

UNITED STATES PATENTS

| Number | Name | Date |
|---|---|---|
| 600,115 | Baker | Mar. 1, 1898 |
| 1,598,242 | Chadeayne | Aug. 31, 1926 |
| 2,101,338 | Lovekin | Dec. 7, 1937 |
| 2,188,441 | Magee | Jan. 30, 1940 |
| 2,190,197 | Simpson | Feb. 13, 1940 |